United States Patent [19]
Takase et al.

[11] Patent Number: 5,822,149
[45] Date of Patent: Oct. 13, 1998

[54] POSITIONING GUIDE MECHANISM AND ERRONEOUS INSERTION DETECTING AND DISCHARGING MECHANISM FOR A RECORDING AND PRODUCING APPARATUS

[75] Inventors: Masaki Takase; Toshio Mamiya; Katsuji Akimoto, all of Tokyo; Akihiro Uetake; Katsuaki Ikema, both of Kanagawa; Kazuyoshi Suzuki; Katsunori Takahashi, both of Tokyo, all of Japan

[73] Assignee: Sony Corporation, Tokyo, Japan

[21] Appl. No.: 805,072

[22] Filed: Feb. 25, 1997

[30] Foreign Application Priority Data

Feb. 27, 1996 [JP] Japan .................................. 8-039987
Mar. 19, 1996 [JP] Japan .................................. 8-063121

[51] Int. Cl.$^6$ .................................................. G11B 5/008
[52] U.S. Cl. ............................................................ 360/94
[58] Field of Search ........................................ 360/94, 85

[56] References Cited

U.S. PATENT DOCUMENTS

| | | | |
|---|---|---|---|
| 5,046,169 | 9/1991 | Tsujino | 360/94 |
| 5,067,036 | 11/1991 | Ozawa | 360/94 |
| 5,386,329 | 1/1995 | Ikegawa | 360/94 |
| 5,493,459 | 2/1996 | Shiomi | 360/94 |
| 5,602,695 | 2/1997 | Nishijima | 360/94 |

*Primary Examiner*—A. J. Heinz
*Attorney, Agent, or Firm*—Frommer Lawrence & Haug LLP; William S. Frommer

[57] ABSTRACT

To provide a recording and reproducing apparatus which permits to use tape cassettes different in not only size but also thickness. In order to make the apparatus cope with the tape cassettes different in size and thickness, there is provided a positioning guide mechanism including a pair of positioning guide members so that a small cassette can be guided at both the side faces on a cassette supporting surface of the cassette holder so as to be depressed and projected by a biasing means, and a pair of side plates at its both sides of a cassette holder so that a large cassette can be guided at its both side faces. If a user is not highly skilled in operating such recording and reproducing apparatus which permits to use tape cassettes different in size and thickness, the apparatus will suffer from risk that the cassettes are erroneously inserted or the user carries out malicious operation. In order to avoid a trouble due to such erroneous insertion, malicious operation or the like, the recording and reproducing apparatus further includes a cassette insertion detecting switch mechanism useful for detecting the insertion of the cassette and leading the cassette into the cassette holder and a holder stopper mechanism composed of a holder unlocking member and a lock member.

11 Claims, 13 Drawing Sheets

F I G. 9
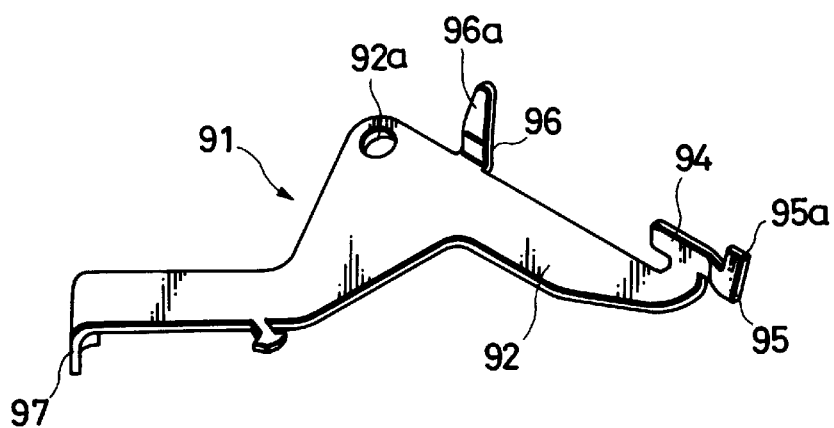

POSITIONING GUIDE MECHANISM AND ERRONEOUS INSERTION DETECTING AND DISCHARGING MECHANISM FOR A RECORDING AND PRODUCING APPARATUS

BACKGROUND

1. Field of the Invention

The present invention relates to recording and reproducing apparatus such as a VCR apparatus (video cassette recorder apparatus) or the like in which two or more kinds of tape cassettes different in size can be inserted into one cassette insertion mouth. More particularly, the present invention relates to a positioning guide mechanism capable of positioning the tape cassettes different in size when the tape cassettes are inserted into a cassette compartment, and an erroneous insertion detecting and discharging mechanism capable of detecting and discharging a tape cassette with resistance against erroneous and malicious operation even when the tape cassette is erroneously inserted or maliciously operated when it is inserted or discharged.

2. Background of the Invention

There has been proposed a compatible type VCR apparatus in which large and small tape cassettes different in size can be inserted from an insertion mouth of the apparatus to be loaded on the cassette holder so as to carry out operation of recording and reproduction.

Such a VCR apparatus has a positioning guide mechanism for leading the tape cassettes different in size into the cassette holder and positioning the tape cassettes at a predetermined position. Such positioning guide mechanism is usually arranged to be actuated by a tape cassette which is equipped with a guide function or formed into a shape making it possible to function the guide mechanism. Also, the cassette holder is provided with a cassette guide member of a fixed type.

Further, a cassette lid unlocking mechanism is arranged to have an unlocking mechanism capable of unlocking cassettes different in size. Alternatively, a large cassette is provided at its bottom portion with a relief such as a groove or a recess, for example, so as to avoid conflict with an unlocking mechanism for a small cassette, whereby the unlocking mechanism for the small cassette and an unlocking mechanism for a large cassette can be independently provided in the recording and reproducing apparatus.

However, there has been no mechanism proposed in the prior art that includes a guide mechanism and a cassette lid unlocking mechanism which can cope with cassettes different in size and also having no cassette lid unlocking mechanism commonly functioning with the guide mechanism and the cassette lid unlocking mechanism provided on the side of the recording and reproducing apparatus. Further, there has been no mechanism proposed in the prior art that can cope with cassettes different not only in size but in thickness.

As described above, the conventional positioning guide mechanism and the cassette lid unlocking mechanism sometimes place limitation on the cassette in terms of appearance and design. Further, the conventional positioning guide mechanism and the cassette lid unlocking mechanism make the cassette complicated in structure and make it difficult to miniaturize the cassette.

Further, if the mechanism of recording and reproducing apparatus deals with cassettes different in thickness, when the small cassette is inserted into the cassette holder and loaded at the loading position, the small cassette may be floated above the cassette holder. In this case, a cassette lid locking nail may be come apart from a lid unlocking member. If such an accident happens, the cassette lid cannot be closed upon ejecting the cassette.

Further, the above-mentioned conventional VCR apparatus permitting large and small tape cassettes to be inserted has been proposed merely for professional use. Therefore, users of the apparatus are supposed to be limited to engineers, i.e., people highly skilled in operating the recording and reproducing apparatus. Accordingly, it is considered that it is not always necessary to provide the above-described erroneous insertion detecting and discharging mechanism for making the apparatus resistant against erroneous operation.

Another example of the arrangement includes two cassette stopper portions formed at the deepest portion of the cassette holder so as to detect insertion of the cassette. According to the arrangement, the entire operation is started when both of the two stopper portions detect the insertion of the cassette, and these cassette stopper portions serve for detecting erroneous insertion of the cassette.

In a normal cassette loading apparatus dealing with a single type of cassette, the erroneous insertion detection is carried out several times such as soon after the cassette is inserted, when the cassette is conveyed horizontally, soon before the cassette is going to move vertically, and so on, and the detection is also made at the front and rear portions and both the side ends of the cassette, whereby wrong orientation of the cassette upon insertion is detected.

However, a cassette utilized with a recording and reproducing apparatus which is obliged to cope with cassettes of different sizes provides a limited space on the cassette for a mechanism for detecting the erroneous insertion of the cassette. Therefore, the tape cassette cannot be formed into a shape which satisfactorily actuates the detecting function. Particularly, the cassette utilized with a digital VTR apparatus provides a vary narrow space for building a detecting mechanism functioning for the large and small cassettes in common.

Further, when a user carries out a malicious operation such as to block the discharge of the cassette, the cassette will be inclined within the cassette holder, with the result that the cassette is running on the insertion detecting portion, which fact makes it difficult to take the cassette out. In order to solve the above problems, there has been proposed a method that the gap between the cassette holder and the cassette is lessened to eliminate the inclination of the cassette. However, the cassette compartment should be arranged to have an allowance in order to deal with large and small cassettes different in thickness. Therefore, it is impossible to eliminate the inclination when the small cassette is accommodated. Accordingly, it is difficult to prevent the cassette from running on the cassette insertion detecting portion.

If a general user operates the recording and reproducing apparatus having no mechanism for detecting erroneous insertion of the cassette and discharging the cassette, the above-described accidents are likely to happen. Therefore, the mechanical unit of the VCR apparatus suffers from risk of damage, or in some case, the cassette cannot be taken out from the mechanical unit.

Further, it is necessary for the large and small cassettes to be provided at their front lid side with abutting portions abutting against a cassette insertion detecting portion, and in addition, it is necessary for the abutting portions to be disposed at the common positions. However, even the small cassette is requested to be designed smaller under consideration of the public use. Therefore, it is difficult for the cassettes different in size to be provided at right and left sides with the common abutting portions having a sufficient size. Further, the cassettes have to be subjected to severe restriction in terms of design. For this reason, the large cassette and the small cassette should have the abutting portions disposed in a limited narrow area in common, and the area sometimes becomes narrow in the height direction due to restrictions in terms of design and structure in case of designing the small cassette. Further, the area in which the common abutting portions can be provided is limited to only the front face of the cassette. In this case, it is difficult to positively detect that the cassette is erroneously inserted.

Further, if the cassettes have the abutting portions disposed in the above-described narrow area in common, when a user performs a malicious operation such as to insert his finger in the midway for discharging the cassette to forcibly depress the cassette or the like, the cassette becomes floated at its front end from the cassette holder. As a result, the cassette runs on the erroneous insertion detecting portion of the cassette holder and the entirety of the cassette becomes inclined, with the result that it becomes difficult to discharge the cassette.

OBJECTS AND SUMMARY OF THE INVENTION

Therefore, it is a general object of the present invention to provide a recording and reproducing apparatus in which the aforesaid shortcomings and disadvantages encountered with the prior art can be eliminated.

More specifically, it is an object of the present invention to provide a recording and reproducing apparatus having a cassette holder which is provided with positioning guide mechanisms and cassette lid unlocking mechanisms respectively capable of coping with cassettes different not only in size but also in thickness, whereby the above-described problems are solved to perform reliable recording and reproducing operation.

It is another object of the present invention to provide a recording and reproducing apparatus in which if the cassette is erroneously inserted into the cassette holder, such erroneous insertion can be accurately and positively detected, the erroneously inserted cassette can be automatically discharged, and the cassette can be prevented from running on an erroneous insertion detecting portion.

According to an aspect of the present invention, there is provided a recording and reproducing apparatus in which two or more kinds of cassettes different in size can be inserted from one cassette insertion mouth, and which can perform shifting motion for shifting the cassette inserted from the insertion mouth to the loading position while the cassette is held by the cassette holder in a standby mode and also perform shifting motion for shifting the cassette to the eject position while the cassette is held by the cassette holder, wherein a pair of positioning guide members for guiding the small cassette at its both side faces are provided on the cassette supporting surface of the cassette holder so as to be depressed and projected by a biasing means, and the cassette holder has side plates as guide plates at both the sides thereof so that the large cassette can be guided at its side faces.

According to the above construction, the small cassette can be guided at its both sides by the pair of positioning guide members of the cassette holder, and accurately inserted into the cassette holder. Also, the large cassette can be guided at its both sides by both the side plates of the cassette holder, and inserted into the cassette holder. When the large cassette is inserted, the large cassette depresses the positioning guide member useful for guiding the small cassette.

The positioning guide member is provided with a cassette lid unlocking tab serving as an abutting tab for the small cassette. Therefore, when the small cassette is guided and inserted into the cassette holder by the positioning guide member, a cassette lid locking nail is released by the cassette lid unlocking tab, and the cassette abuts against the cassette lid unlocking tab to be positioned in the cassette holder in the depth direction.

The biasing means of the positioning guide member is formed of a spring member. Therefore, the positioning guide member can be depressed or projected relative to the cassette holder owing to the resilient deformation property of the spring member.

The positioning guide member is made to have a slope which increases in height from the cassette insertion side to the opposite side thereof and provided with the cassette lid unlocking tab at the top of the slope. Therefore, when a cassette with a thin thickness is inserted into the cassette holder and loaded at the loading position of the cassette holder, even the cassette may be floated from the cassette holder, the cassette can be maintained to contact at its cassette lid locking nail to the cassette lid unlocking tab. Thus, the cassette lid is maintained in the open state.

The positioning guide member is provided with a guide surface for guiding the small cassette inserted into the cassette holder. Therefore, the cassette can be led and guided by the guide surface, and accurately inserted into the positioning guide member.

Further, according to another aspect of the present invention, there is provided a recording and reproducing apparatus in which two or more kinds of cassettes different in size can be inserted from one cassette insertion mouth, and which can perform shifting motion for shifting the cassette inserted from the insertion mouth to the loading position while the cassette is held by the cassette holder in a standby mode and also perform shifting motion for shifting the cassette to the eject position while the cassette is held by the cassette holder, wherein the recording and reproducing apparatus further includes a cassette insertion detecting mechanism which is disposed at the entrance side of the cassette holder and useful for detecting the insertion of the cassette into the cassette holder and loading the cassette into the cassette holder, and a holder stopper mechanism composed of the holder unlocking member which projects on the cassette stopper portion side of the cassette holder and arranged to retreat when it is contacted to the front end portion of the cassette and a lock member for unlocking the cassette holder in ganged relation with the retreat operation of the holder unlocking member.

According to the above arrangement, if the cassette is normally inserted into the cassette holder, the holder unlocking member is retreated by the cassette at its abutting portion of the front end portion and releases the lock member, bringing the holder stopper mechanism in a released state. Thus, the cassette holder can be actuated into the loading motion.

When the cassette is erroneously inserted into the cassette holder, the cassette cannot actuate the holder unlocking member by the abutting portion of the cassette. Therefore, the holder stopper mechanism brings the cassette holder into a locking state, preventing the cassette holder from starting the loading motion. Then, the erroneous insertion of the cassette is detected by a time period in which the cassette insertion detecting switch mechanism is turned on, and the cassette is discharged from the cassette holder.

Further, the cassette insertion detecting switch mechanism and the holder unlocking member of the holder stopper mechanism are separately disposed on the right and left sides of the path in which the cassette is inserted into the cassette holder. Therefore, even if the cassette is erroneously inserted into the cassette holder to fail in actuating neither of the cassette insertion detecting switch mechanism and the holder stopper mechanism, the erroneous insertion of the cassette can be detected and the cassette can be discharged.

The holder stopper mechanism is provided at its portion with an abutting guide member which projects higher than the holder unlocking member in order that the cassette is prevented from running on the holder unlocking member. Therefore, even if a user performs a malicious operation such as to block the cassette from being discharged in the midway of the ejecting operation, leading to the floating state of the cassette from the cassette holder at its front end portion, then the cassette can abut against the abutting guide member at its front end portion, thereby being prevented from running on the holder unlocking member. Accordingly, the cassette can be discharged.

Moreover, if the cassette holder is normally inserted into the cassette holder, the single holder unlocking member can be actuated by the cassette abutting portions of the cassettes different in size. Therefore, the cassette holder may be provided with only one holder unlocking member for unlocking the cassettes different in size.

Furthermore, the abutting guide member is formed to be inclined outside from the deepest edge of the cassette holder. Therefore, the cassette lid is free from obstruction when it is opened and closed.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 9 is a perspective view of a holder stopper mechanism;

DETAILED DESCRIPTION OF THE PREFERRED EMBODIMENTS

Embodiments of the recording and reproducing apparatus according to the present invention will hereinafter be described with reference to drawings by way of examples in which the present invention is applied to a VCR apparatus of a compatible type for consumer use which makes it possible to utilize two kinds of cassettes, i.e., a large and small tape cassettes.

Figure 1:
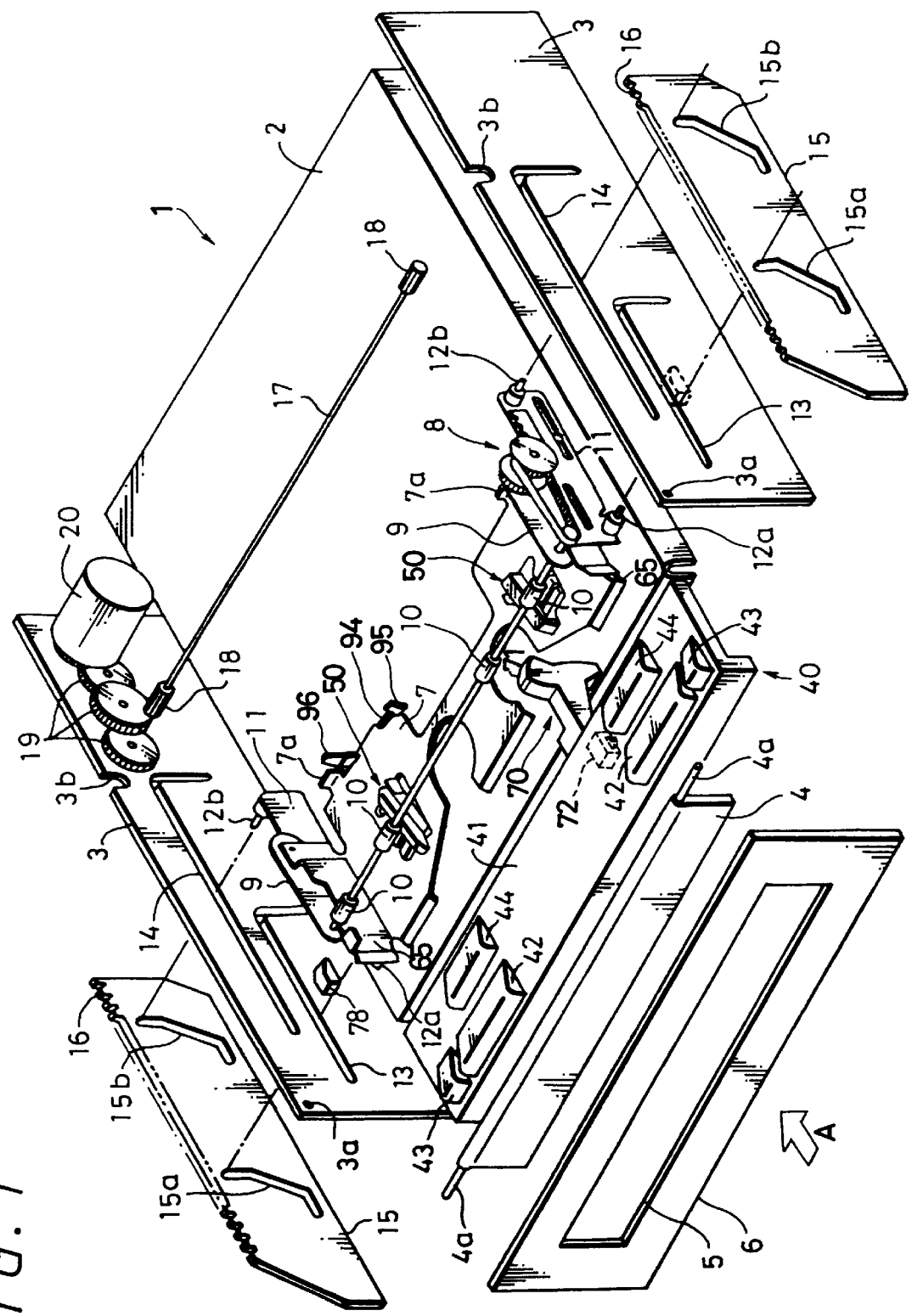
FIG. 1 is an exploded perspective view of a cassette compartment of a VCR apparatus according to the present invention which includes a positioning guide mechanism and a holder stopper mechanism.
Figure 2:
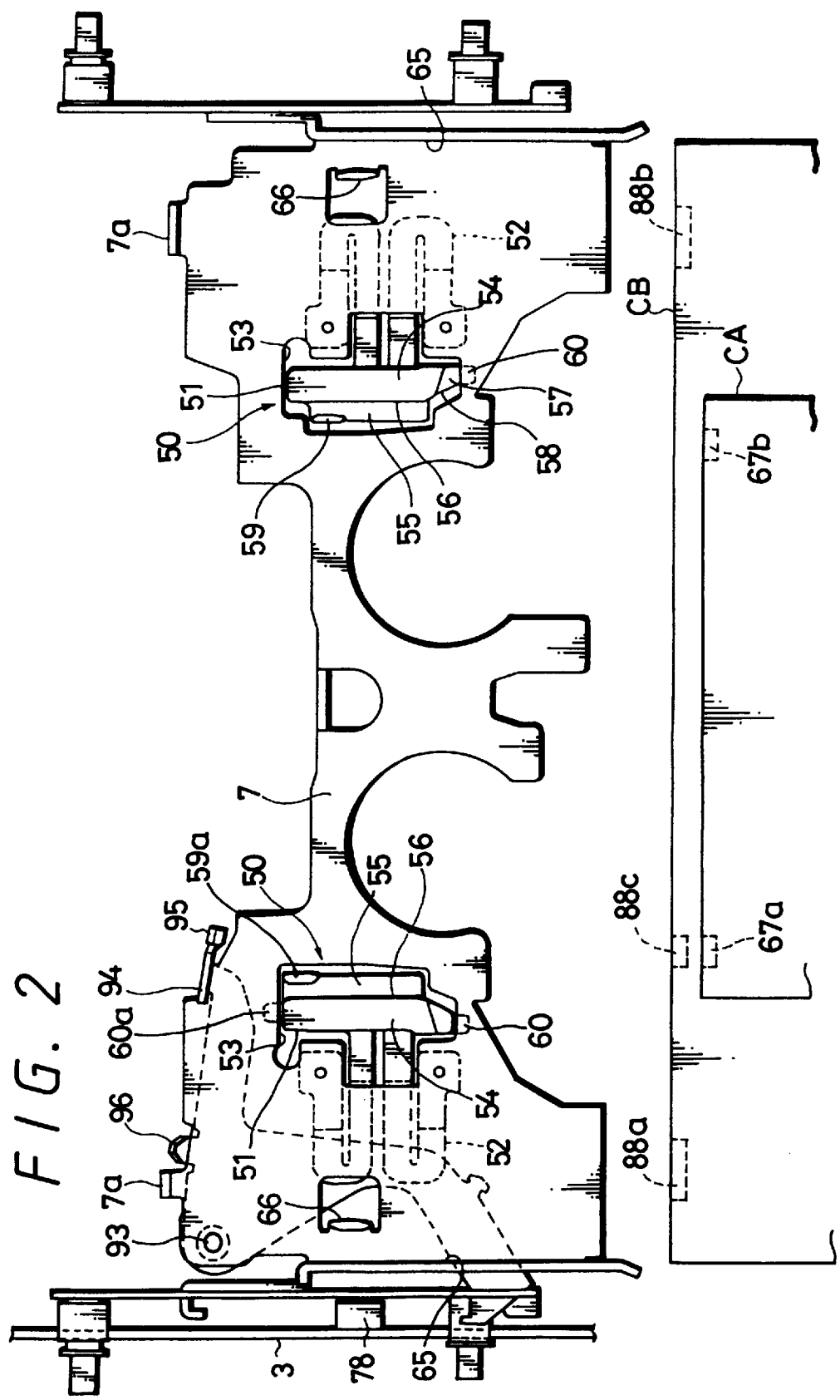
FIG. 2 is a plan view of a cassette holder equipped with the positioning guide mechanism and the holder stopper mechanism.
Figure 3:
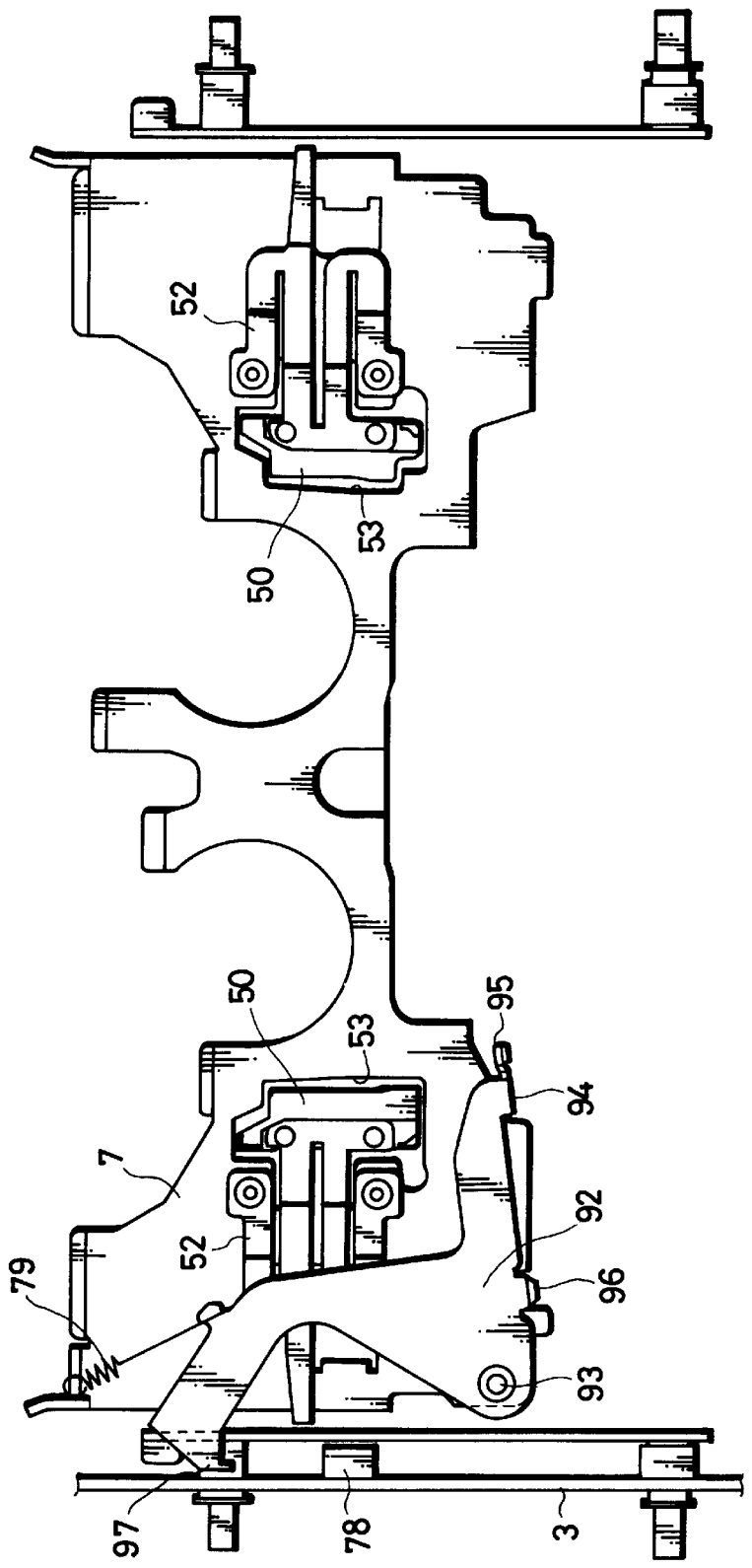
FIG. 3 is a back side view of the cassette holder including the holder stopper mechanism.

FIG. 1 is an exploded diagram of a cassette compartment of the VTR apparatus of the present embodiment, FIG. 2 is a plan view of a cassette holder equipped with a positioning guide mechanism and a holder stopper mechanism as main portions of the present invention, and FIG. 3 is a back side view of a cassette holder of the present embodiment.

Initially, an arrangement of the cassette compartment will be described with reference to FIG. 1.

Reference numeral 1 depicts an overall structure of the cassette compartment and a direction indicated by an arrow A is a direction in which a tape cassette, although not shown, is inserted. The cassette compartment 1 has a pair of cassette compartment frames 3, 3 standing on a mechanical chassis 2 at both the side thereof. The cassette compartment 1 also has at its entrance side a cassette door 4. The cassette door 4 has a pair of support shafts 4a, 4a provided at its upper end portion and the shafts 4a, 4a are respectively supported by a pair of support portions 3a, 3a formed on the cassette frames 3, 3 so that the cassette door 4 can be swingably moved. The cassette compartment 1 has a front panel 6 with a cassette insertion mouth 5 in front of the cassette door 4.

The cassette compartment 1 includes therein a cassette holder 7 which is capable of conveying a tape cassette to a loading position and an ejecting position. The cassette holder 7 has a cassette loading and unloading mechanism 8 at one side thereof. Since the cassette loading and unloading mechanism 8 is not a main part of the present invention, it will not be described in detail, but its mechanical operation thereof will be described.

When the tape cassette is inserted into the cassette holder 7, a cassette insertion detecting switch mechanism 70, which will be described later on, detects the insertion of the cassette, actuating a loading motor 20. When the loading motor 20 is driven, a roller 10, which is supported by support arms 9, 9 at the upper portion of the cassette holder 7 through the cassette loading and unloading mechanism 8 and extends across the cassette holder 7, is rotated in a direction for drawing the cassette into the cassette compartment 1, whereby the tape cassette is drawn into the depth of the cassette compartment 1 until the tape cassette abuts against a cassette stopper 7a provided at the innermost position of the cassette holder 7.

When the tape cassette is moved together with the cassette holder 7 to the eject position, the roller 10 is rotated in the direction inverse to the above-described loading direction by the cassette loading and unloading mechanism 8 so that the rear end portion of the tape cassette is discharged out of the cassette insertion mouth 5.

The cassette loading and unloading mechanism 8 operating as described above includes holder sliders 11, 11. Each of the holder sliders 11, 11 has a pair of guide shafts 12a, 12a, 12b, 12b arranged to be engaged with a pair of loading guide grooves 13, 14 formed through the cassette compartment frames 3, 3 to extend in the horizontal direction and vertical direction, respectively. The guide shafts 12a, 12a, 12b, 12b penetrate the loading grooves 13, 14 and are engaged with a pair of loading cam grooves 15a, 15a which are formed through drive sliders 15, 15 disposed outside surfaces of the cassette compartment frames 3, 3. The drive slider 15 has a rack 16 formed on the upper edge thereof.

Racks 16, 16 of the drive sliders 15, 15 are meshed with gears 18, 18 provided at both the sides of a shaft 17 which is supported by bearings 3b, 3b on the upper edge of the cassette compartment frames 3, 3. The motor 20 transmits a rotative drive force to one of the gears 18 through a reduction gear 19.

Further, the cassette compartment 1 includes a guide mechanism 40 provided between the above-described front panel 6 and the cassette holder 7. The guide mechanism 40 serves for guiding a large cassette and a small cassette, although not shown, to a predetermined position on the cassette holder 7 and preventing the cassettes from being inserted erroneously.

An arrangement of the guide mechanism 40 will be briefly described. The guide mechanism 40 has a frame surface 41 flush with an accommodating portion of the cassette holder 7. On the frame surface 41, there are provided a pair of small cassette slopes 42, 42 provided on the right and left sides of the frame surface 41, a pair of large cassette slopes 43, 43 provided on the right and left sides outside the small cassette slopes 42, 42 of the frame surface 41, and cassette stoppers 44, 44 provided on the rear side of the small cassette slopes 42, 42, and these slopes and stoppers are urged upwardly by a link mechanism not shown.

The distance between the small cassette slopes 42, 42 and the distance between the cassette stoppers 44, 44 correspond to a width of the small cassette. Therefore, when the small cassette is inserted from the cassette insertion mouth 5, the small cassette will be guided by the small cassette slopes 42, 42 and the cassette stoppers 44, 44 and loaded on the cassette holder 7.

Each of the large cassette slopes 43, 43 is interlocked with one of the cassette stoppers 44, 44 which is located on the diagonally opposite side, and the width of the large cassette slopes 43, 43 is coincident with the width of the large cassette. Thus, when the large cassette is inserted from the cassette insertion mouth 5 to depress both the large cassette slopes 43, 43, the cassette stoppers 44, 44 are also depressed in an interlocking fashion, whereby the large cassette passes through the cassette insertion mouth 5 and loaded on the cassette holder 7. If a user tries to insert the small cassette at a position deviated from the regulated position, the cassette stopper 44 abuts against the small cassette, preventing the small cassette from being inserted.

Now, the positioning guide mechanism for the small cassette as the main portion according to the first aspect of the present invention will be described with reference to FIGS. 1, 2 and 3. In FIG. 2, the small cassette is represented by a reference symbol CA and the large cassette is represented by a reference symbol CB.

Reference numeral 50 depicts the overall arrangement of the positioning guide mechanism, and the cassette compartment includes a pair of the positioning guide mechanisms 50 at the center portion of the cassette support surface of the cassette holder 7. Since both of the positioning guide mechanisms 50 have virtually the same construction, only one of the positioning mechanisms 50 (the right one in FIG. 2) will be described.

The positioning guide mechanism 50 is formed of a positioning guide member 51 formed by means of molding and a spring member 52 resiliently supporting the positioning guide member 51. The positioning guide member 51 is disposed to be projected from an aperture 53 formed through the support surface of the cassette holder 7. Further, the spring member 52 is fixed at its one end on the back face of the positioning guide member 51 and fixed in a caulking fashion at its other end on the back face of the cassette holder 7. The spring member 52 is formed into a meandering shape to provide a large spring constant.

The above-described positioning guide member 51 is as a whole formed of a wall portion 54 increasing in height toward the outer side and a cassette riding surface 55 decreasing in height toward the inner side. An inner wall of the wall portion 54 serves as a guide wall surface 56 which guides the small cassette CA at the side face of the small cassette CA. Further, the wall portion 54 has a slope 57 on the cassette insertion side so that the large cassette CB can easily ride on the wall portion 54. The wall portion 54 also has a guide surface 58 so that the small cassette CA can be guided by the guide wall surface 56. The positioning guide mechanism 50 includes a cassette lid unlocking tab 59 projecting in a rib like shape for releasing a lid lock nail of the small cassette CA at a side end portion opposite to the cassette insertion side of the cassette riding face 55. The cassette lid unlocking tab 59 also serves as an abutting tab when the small cassette CA is positioned by abutting against the cassette holder 7.

Reference numeral 60 is a nail tab extending from the end portion of the slope side 57 of the positioning guide member 51 and engaging with the cassette holder 7 at its back side. The nail tab 60 prevents the positioning guide member 51 from excessively projecting from the cassette holder 7. The end portion of the slope 57 is lowered from the cassette support surface of the cassette holder 7.

Further, the above-described positioning guide member 51 is made to have a slope gradually increasing in height toward the side of the cassette lid unlocking tab 59. By way of an example for the case, if the positioning guide member 51 is made to have a slope face at an attaching surface with the spring member 52, the spring member 52 will be free from twisting.

The positioning guide member 51 is different from the other positioning guide member 51 (left side in FIG. 2) in the following points. The other positioning guide member 51 has the cassette lid unlocking tab 59 functioning only as an abutting tab 59a for the cassette. For this reason, one of the cassette lid unlocking tab 59 is deviated relative to the other abutting tab 59a in the front-and-rear direction.

Figure 4:
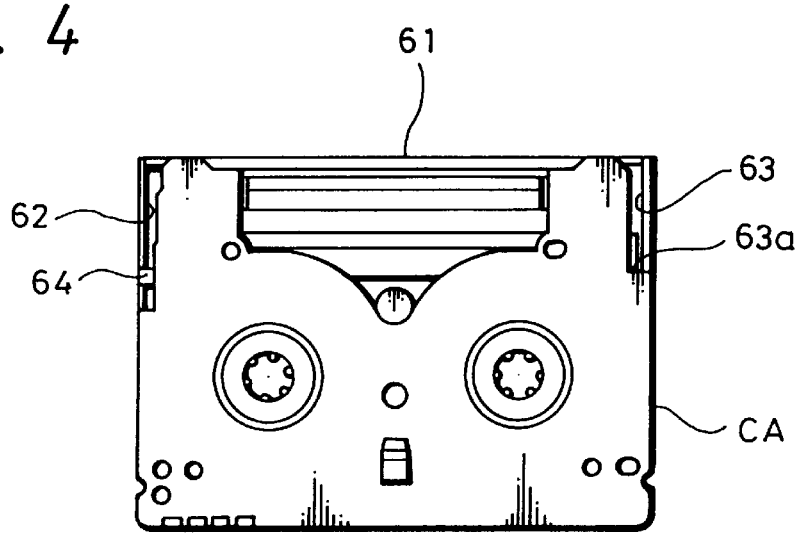
FIG. 4 is a back side view of a small cassette.

Why the two tabs 59 and 59a are deviated relative to each other will be described in conjunction with a structure of the back face of the small cassette CA which is illustrated in FIG. 4. The small cassette CA has at the right and left sides of a cassette lid 61 a groove 62 into which the cassette lid unlocking tab 59 is inserted and a groove 63 into which the abutting tab 59a is inserted. A cassette lid locking nail 64a is provided on one end portion side of the one groove 62. Both of the grooves 62, 63 are designed to have different length, i.e., the other groove 63 is made shorter than the groove 62 in accordance with the design of the small cassette CA.

Since the small cassette CA is arranged as above, when the small cassette CA is positioned on the cassette holder 7, the cassette lid unlocking tab 59 abuts against the lid locking nail 64 while the abutting tab 59a abuts against an end portion 63a of the groove 63. Therefore, the cassette lid unlocking tab 59 and the other abutting tab 59a are deviated relative to each other in the front-and-rear direction.

The other positioning guide member 51 has a nail tab 60a provided at a position opposite to the above-described nail tab 60 and engaging with the back face of the cassette holder 7.

On the other hand, a positioning guide mechanism for the large cassette CB is comprised of guide plates 65, 65, i.e., side plates standing from both the side of the cassette holder 7. These guide plates 65, 65 guide the large cassette CB at both the side faces when the cassette CB is loaded on the cassette holder 7. The cassette holder 7 has a pair of cassette lid unlocking tabs 66, 66 for the large cassette CB at positions near the guide plates 65, 65. Although not shown, the large cassette CB has a pair of cassette lid locking tabs at the right and left portions thereof.

Operation of the positioning guide mechanisms for the small cassette CA and the large cassette CB will be described below.

Figure 5:
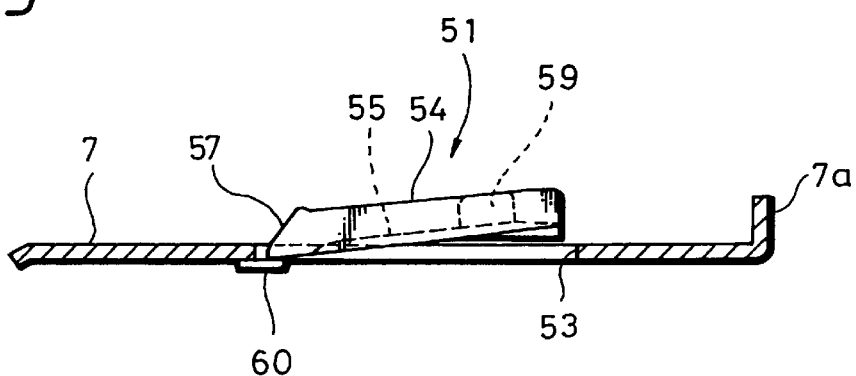
FIG. 5 is a cross-sectional view of the cassette holder in which no cassette is inserted.
Figure 6:
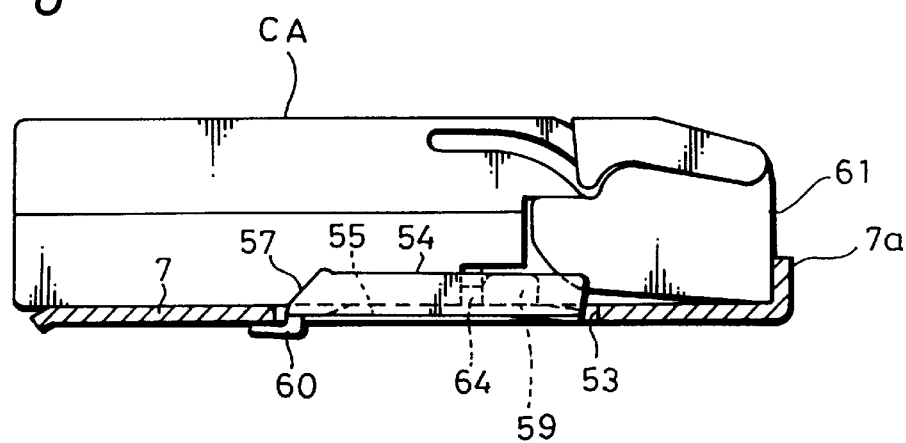
FIG. 6 is a diagram showing the small cassette inserted into the cassette holder.
Figure 7:
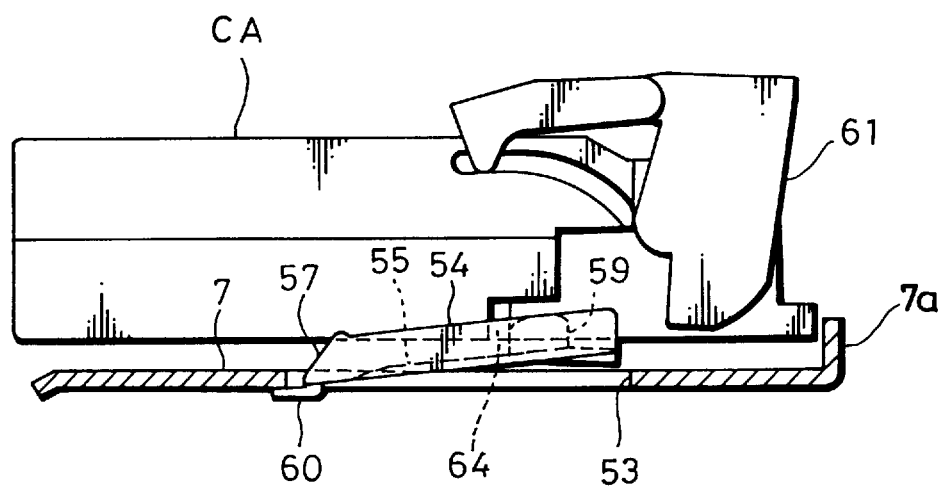
FIG. 7 is a diagram showing the small cassette which is inserted into the cassette holder and placed at the loading position.

Initially, an operation of the positioning guide mechanism for the small cassette CA will be described with reference to FIG. 2 and FIGS. 5 through 7. FIGS. 5 through 7 show operation of one of the positioning guide members 51.

FIG. 5 shows a state of the positioning guide member 51 in which the small cassette CA is not inserted into the cassette holder 7. As shown in FIG. 5, the positioning guide member 51 is projected above the cassette holder 7 by the spring member 52 (see FIG. 2). Under this state, if the small cassette CA is inserted from the cassette insertion mouth 5 through the guide mechanism 40 onto the cassette holder 7 as shown in FIG. 2, the small cassette CA contacts at its right and left bottom surfaces to the riding surfaces 55, 55 of the pair of the positioning guide members 51, 51, and depresses the riding surfaces 55, 55 downwardly to make the riding surface flush with the cassette support face of the cassette holder 7. Thus, the small cassette CA is guided at its both the side faces by the guide wall faces 56, 56, and inserted with its right and left sides positioned.

Even if the small cassette CA is inserted with some deviation in the right and left direction when the small cassette CA is guided by the positioning guide members 51, 51, the small cassette CA can be inserted into a space between the positioning guide members 51, 51 smoothly.

When the small cassette CA is inserted, the cassette lid unlocking tab 59 provided on the riding face 55 depresses the lid locking nail 64 of the cassette CA to unlock the cassette lid 61. When the lid locking nail 64 unlocks the cassette lid 61, the small cassette CA abuts against the cassette lid unlocking tab 59 as shown in FIG. 6, and at the same time, the abutting tab 59a abuts against the end portion 63a of the other groove 63 of the small cassette CA. Thus, the small cassette CA is positioned at the innermost position within the cassette holder 7.

When the small cassette CA is lowered together with the cassette holder 7 from the cassette insertion state shown in FIG. 6 to a loading position shown in FIG. 7, the cassette lid 61 is opened by a frame member not shown.

In this manner, when the small cassette CA is going to be loaded, the small cassette CA is positioned in height by a height determining pin, not shown, standing on the mechanical deck side. However, if the small cassette CA is designed to have a thin thickness as compared with the large cassette CB, the small cassette CA will be floated above the cassette supporting surface of the cassette holder 7. Even in such case, the positioning guide member 51 projects the original projecting position owing to restoration force of the spring member. Moreover, since the positioning guide member 51 has a slope increasing in height toward the side of the cassette lid unlocking tab 59, the cassette lid unlocking tab 59 is prevented from being disengaged from the lid locking nail 64 of the small cassette CA, and the cassette lid 61 is maintained to be opened.

Figure 8:
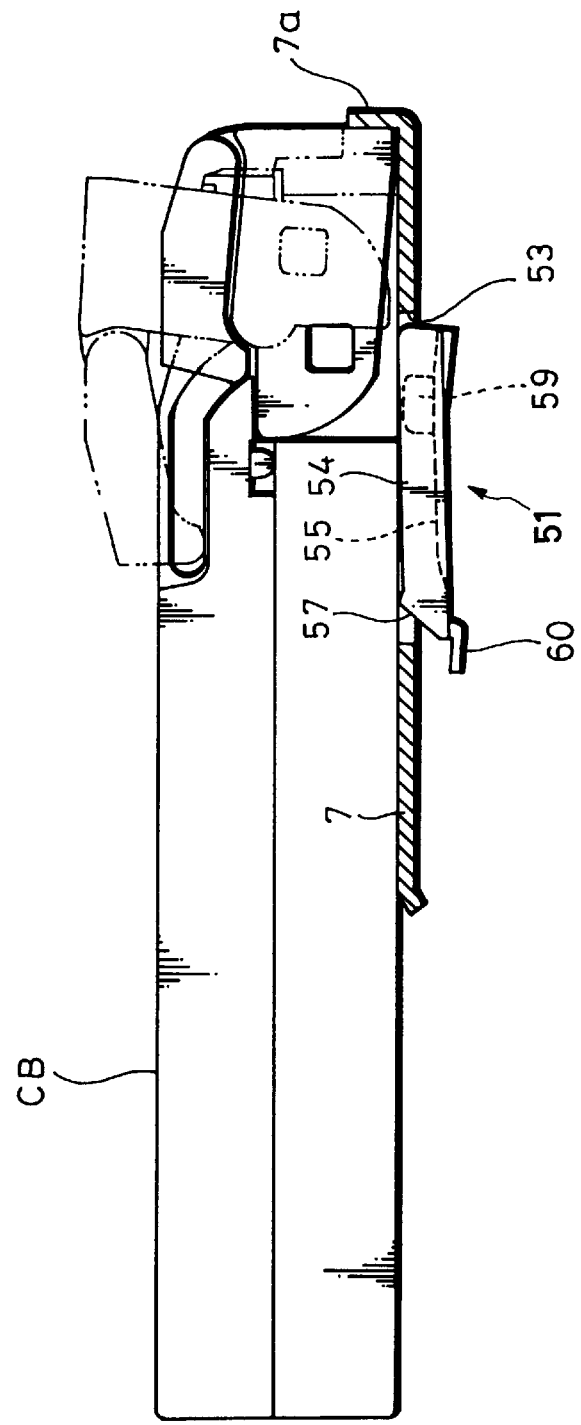
FIG. 8 is a diagram showing the large cassette inserted into the cassette holder.

Operation of the positioning guide mechanism for the large cassette CB will be described with reference to FIGS. 2, 5 and 8 below. FIGS. 5 and 8 show operation of the positioning guide member 51 disposed on one side of the guide plate 7.

When the large cassette CB is inserted from the above-described cassette insertion mouth 5 through the guide mechanism 40 into the cassette holder 7 as shown in FIG. 2, the large cassette CB is guided at its both side faces by the guide plates 65, 65 of the cassette holder 7. When the large cassette CB abuts against the slope 57 of the positioning guide member 51 useful for positioning the small cassette CA, the entirety of the guide member 51 is depressed against the spring member 52 as shown in FIG. 8 and accommodated within the opening aperture 53. With this operation, cassette lid unlocking tabs 66, 66 for the large cassette CB contact to a cassette lid locking nail, though not shown, of the large cassette CB, unlocking the cassette lid of the large cassette CB. At this time, the stoppers 7a, 7a of the cassette holder 7 abut against the cassette lid of the large cassette CB, positioning the large cassette CB.

When the large cassette CB is lowered together with the cassette holder 7 from the cassette insertion state shown in FIG. 8 to the loading position, the cassette lid is opened as shown by a phantom line in FIG. 8 by a frame member which is not shown.

In this manner, when the large cassette CB is brought to the loading position, the large cassette CB is positioned in height by a height determining pin, though not shown, standing on the mechanical deck side. Incidentally, the large cassette CB is designed to have a larger thickness than the small cassette CA. Therefore, the large cassette CB will be prevented from being floated above the cassette supporting surface of the cassette holder 7.

As described above, according to the present invention, the positioning guide mechanism is provided on the cassette holder 7. Therefore, the large and small cassettes CB, CA having different sizes and thicknesses can be accurately inserted and positioned on the cassette holder 7 by the respective exclusively-useful positioning guide mechanisms. Moreover, since the cassette need not be provided with any guiding mechanism at all, the appearance of the cassette may not be deteriorated in designing standpoint. Further, since the cassette need not be subjected to restriction in terms of shape and function, a smaller cassette can be made smaller. Accordingly, the VCR apparatus can be further made small.

The positioning guide member 51 is provided with the cassette lid unlocking tab 59 which also serves as an abutting tab for the small cassette CA. Therefore, it is possible to guide the small cassette CA into the cassette holder 7, position the small cassette CA in the depth direction of the cassette holder 7 and unlock the cassette lid locking nail at a time.

Since the positioning guide member 51 is formed of the spring member 52, the positioning guide member 51 can be arranged to be pressed down and projected relative to the cassette holder 7 with ease.

Further, the positioning guide member 51 is made to have a slope increasing in height from the cassette insertion side to the opposite side, and provided with the cassette lid unlocking tab 59 at the rising portion of the guide member 51. Therefore, even when a cassette with a thin thickness is inserted, the lid locking nail of the cassette is positively brought and maintained in contact to the cassette lid unlocking tab 59. Accordingly, the small cassette CA will not be subjected to restriction in thickness, and a smaller cassette can be realized. Moreover, when it is considered that the small cassette CA is designed for use with a VCR apparatus exclusively useful for small-type cassettes, the thickness of the small cassette can be decided regardless of a case in which the small cassette is used with a VCR apparatus which copes with not only a small cassette but a large cassette. Therefore, the VCR apparatus exclusively useful for small-type cassettes can be made small.

Furthermore, the positioning guide member 51 is provided with the guide surface 58 which is useful for guiding the small cassette CA when the small cassette CA is inserted. Therefore, the cassette CA can be guided by the guide surface and inserted into the positioning guide member 51 accurately.

In the above embodiment, the positioning guide members 51, 51 are made to be depressed and projected by the independently provided spring members 52, 52, respectively. However, both of the positioning guide members 51, 51 may be made to be depressed and projected by a single means such as a link member, or alternatively, both the positioning guide members 51, 51 may be arranged to be depressed and projected in an interlocking fashion, for example.

Now, the above-introduced cassette insertion detecting switch mechanism 70 for detecting a cassette which is inserted into the cassette holder 7 will be briefly described with reference to FIG. 1.

The cassette insertion detecting switch mechanism 70 is comprised of a cassette insertion detecting member 71 and a detecting switch 72. The cassette insertion detecting member 71 is provided in the insertion path of the cassette at a position shifted to the right cassette stopper 44 of the above-described guide mechanism 40 as viewed from the cassette insertion mouth 5. The cassette insertion detecting member 71 is attached to the guide mechanism 40 so as to be depressed and projected relative to the frame surface 41. The cassette insertion detecting mechanism 71 is urged upwardly above the frame surface 41 by a spring member not shown. When a user inserts a cassette to rotate the cassette insertion detecting member 71, the detecting switch 72 is turned on so that the insertion is detected electrically.

Next, an arrangement of a holder stopper mechanism as a main portion of the second aspect of the present invention will be described with reference to FIGS. 1 to 3 and FIG. 9, which is a perspective view of the holder stopper mechanism.

Figure 10:
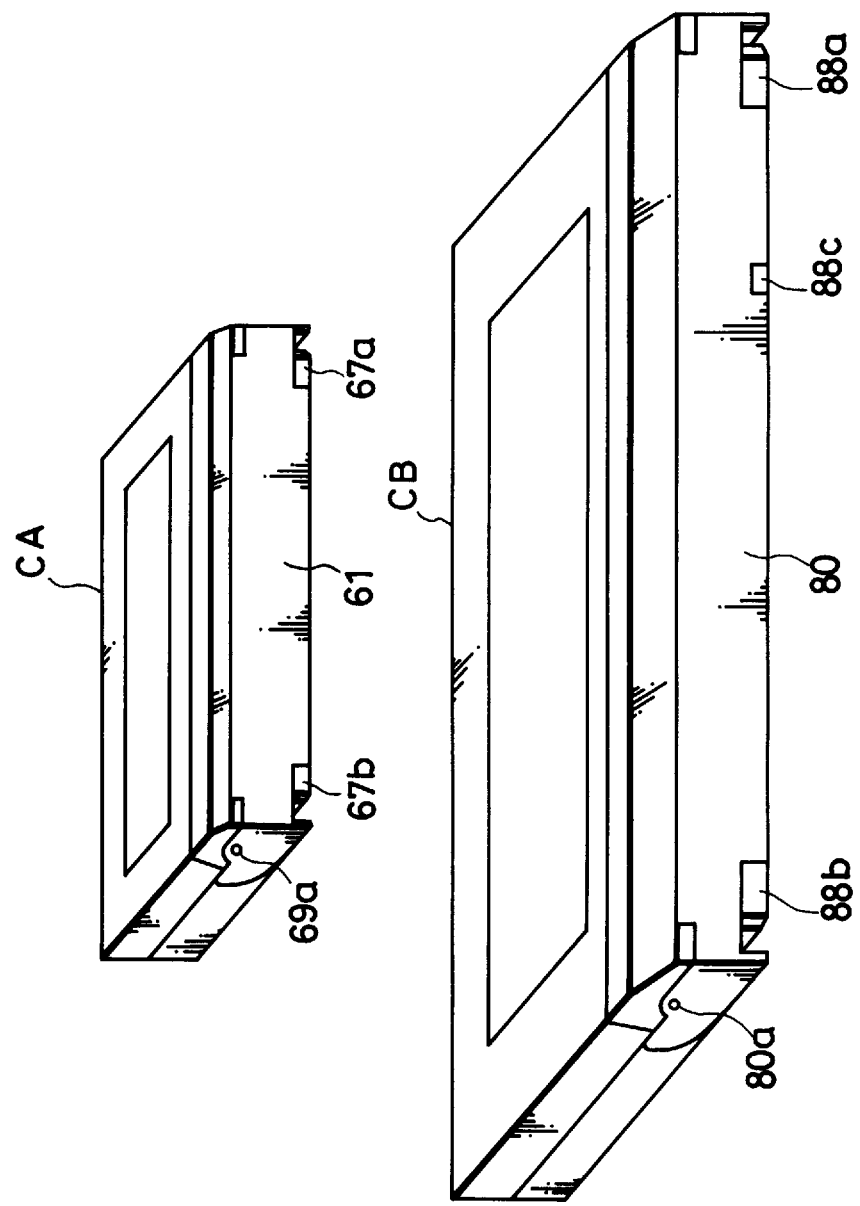
FIG. 10 is a perspective view of the small cassette and the large cassette.

As shown in FIG. 10, the small cassette CA has at the front side thereof a cassette lid 61 which can be opened or closed by rotation around a rotational shaft 69a. The small cassette CA also is provided with a pair of right and left abutting portions 67a, 67b at the lower portions of the front face of the cassette lid 61.

Similarly to the small cassette CA, the large cassette CB has a cassette lid 80 which can be opened or closed by rotation around a rotational shaft 80a. The large cassette CB also is provided with a pair of right and left abutting portions 88a, 88b at the lower portions of the front face of the cassette lid 80. The pair of abutting portions 88a, 88b correspond to the above-described stopper portions 7a, 7a at the front end portions of the cassette holder 7. Further, the large cassette CB is provided with a second abutting portion 88c at a position shifted to one abutting portion 88a.

As shown in FIG. 9, the entirety of the holder stopper mechanism is represented by reference numeral 91, and the main portion thereof is a holder stopper main portion 92. The holder stopper main portion 92 is disposed on the side opposite the side on which the above-described cassette insertion detecting switch mechanism 70 is provided, with respect to the center of the cassette holder 7. The holder stopper mechanism 91 is supported on the back face of the cassette holder 7 so as to be rotatable around a pivot shaft 93.

The holder stopper main portion 92 has at its one end side a holder unlocking tab 94 formed bent so as to be projected on the front end side of the support surface of the cassette holder 7 and a first abutting guide tab 95 at one end portion. The first abutting guide tab 95 is formed to be projected higher than the holder unlocking tab 94, and the upper half of the first abutting guide tab 95 is formed into a slant surface 95a inclined to the outside of the holder stopper main portion 92. The first abutting guide tab 95 is disposed at a position where it can abut against both the abutting portion 67a of the small cassette CA and the second abutting portion 88c of the large cassette CB when the small and large cassettes CA, CB are inserted into the cassette holder 7.

The holder stopper main portion 92 has at its one end side a second abutting guide tab 95 formed bent so as to be adjacent to one stopper portion 7a of the cassette holder 7 at the front end portion side of the support surface of the cassette holder 7. The second abutting guide tab 96 is formed to be projected longer than the first abutting tab 95, and the upper half of the second abutting tab 96 is formed into a slant surface 96a inclined to the outside of the holder stopper main portion 92. The second abutting guide tab 96 corresponds to the one abutting portion 88a of the large cassette CB.

Further, the holder stopper main portion 92 is provided at the other end side with a locking tab 97. As shown in FIG. 3, the locking tab 97 can be engaged and disengaged with/from a block member 78 attached to the cassette compartment frame 3. Reference numeral 92a is an aperture through which the pivot shaft 93 is inserted so that the holder stopper main portion 92 is pivotally supported by the cassette holder 7.

FIG. 3 illustrates a state in which the above-arranged holder stopper mechanism 91 is attached to the back face of the cassette holder 7. As shown in FIG. 3, the holder stopper mechanism 91 is biased in a rotational direction by a tension coil spring 79 stretched between the cassette holder 7 and the holder stopper mechanism 91 so that the locking tab 97 is urged to be locked with the block member 78.

Next, an operation of the holder stopper mechanism 91 will be described.

First, an operation of the holder stopper mechanism 91 when the small cassette CA is inserted will be described. When the small cassette CA is inserted from the cassette insertion mouth 5 into the cassette holder 7, the small cassette CA is further positioned by the positioning guide mechanism 50 and led to the cassette compartment 1, the cassette insertion detecting switch mechanism 70 is turned on. Thus, that the cassette has been inserted is electrically detected, actuating the cassette compartment motor 20. When the cassette compartment motor 20 is driven to actuate the loading and unloading mechanism 8, the cassette is drawn into the cassette holder 7. In this case, if the cassette is caught in the midway into the cassette holder 7, which fact is detected by the rotation of the cassette compartment motor 20, so that the cassette compartment motor 20 is inversely rotated to discharge the cassette by the loading and unloading mechanism 8.

On the other hand, if the cassette is normally inserted up to the deepest place of the cassette holder 7, the abutting portion 67a of the small cassette CA abuts against the first abutting guide tab 95 of the holder stopper mechanism 91, whereby the holder stopper mechanism 91 is rotated in the counterclockwise direction in FIG. 2 and the locking tab 97 is disengaged from the block member 78. In this manner, the cassette holder 7 can be moved to the loading position by the cassette compartment motor 20.

If the cassette is erroneously inserted and the cassette cannot abut against the first abutting guide tab 95 of the holder stopper mechanism 91, the locking tab 97 of the holder stopper mechanism 91 is locked by the block member 78 and the cassette holder 7 becomes prevented from being moved. In this case, similarly to the above case, the cassette compartment motor 20 may be inversely rotated to actuate the cassette loading and unloading mechanism 8, thereby to discharge the cassette. Further, if the small cassette CA is erroneously inserted to fail in actuating the cassette insertion detecting switch mechanism 70, the cassette compartment motor 20 will not drive even though the cassette is inserted into the depth of the cassette holder 7 to abut against the first abutting guide tab 95 of the holder stopper mechanism 91. Therefore, the cassette may be prevented from being drawn.

Figure 11:
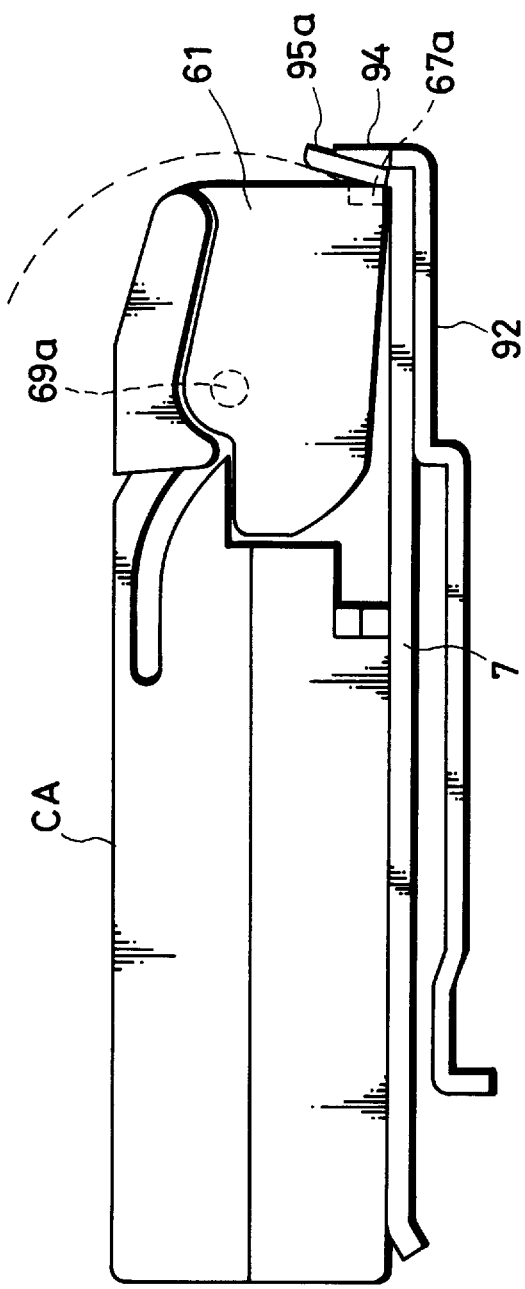
FIG. 11 is a diagram showing the small cassette inserted into the cassette holder equipped with the holder stopper mechanism.

FIG. 11 shows a state in which the cassette holder 7 having the small cassette CA loaded thereon is just going to shift from the horizontal movement to the lowering movement to the loading position. In this state, the small cassette CA abuts at its abutting portion 67a against the first abutting guide tab 95 of the holder stopper mechanism 91. From this state, the small cassette CA can open its cassette lid 61. However, since the oblique surface 95a provided at the upper portion of the first abutting guide tab 95 is inclined outside, the cassette lid 61 opening along the opening locus will not face obstruction.

Figure 12:
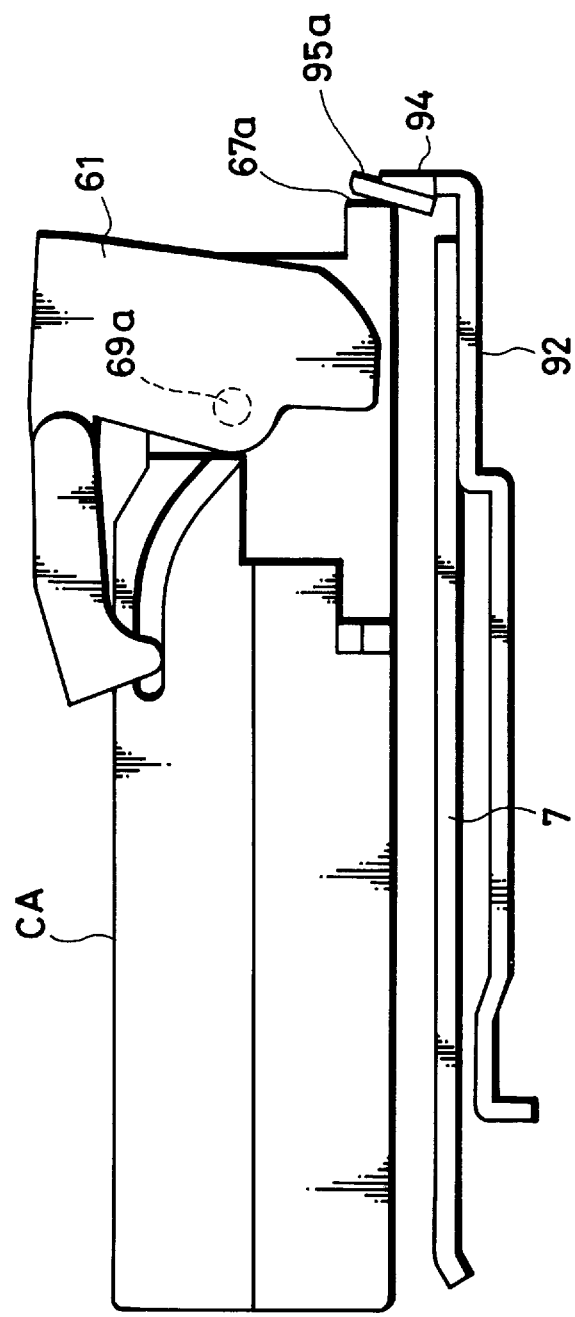
FIG. 12 is a diagram showing the small cassette which is inserted into the cassette holder equipped with the holder stopper mechanism and placed at the loading position.

FIG. 12 shows a state in which the cassette holder 7 is lowered to reach the loading position. At that time, the small cassette CA is floated above the support surface of the cassette holder 7. However, since the first abutting guide tab 95 is designed to have its upper portion 95a sufficiently high to maintain contact to the cassette even if the cassette is floated by the amount, the cassette CA can be prevented from running on the first abutting guide 95 at the abutting portion 67a.

Further, if a user performs a malicious operation such as to press the rear end portion of the small cassette CA in the midway of discharging operation to prevent the cassette from smooth discharge, and the small cassette CA is floated at its front end portion to be inclined, the small cassette CA is maintained to abut against the first abutting tab 95 at its front end portion. Therefore, the small cassette CA can be prevented from running on the holder unlocking tab 94.

When the large cassette CB is inserted and loaded on the cassette holder 7, the second abutting portion 88c abuts against the first abutting guide tab 95 of the holder stopper mechanism 91 to unlock the cassette holder 7. When the large cassette CB is unlocked, the first abutting portion 88a abuts against the second abutting guide tab 96 of the holder stopper mechanism 91.

Figure 13:
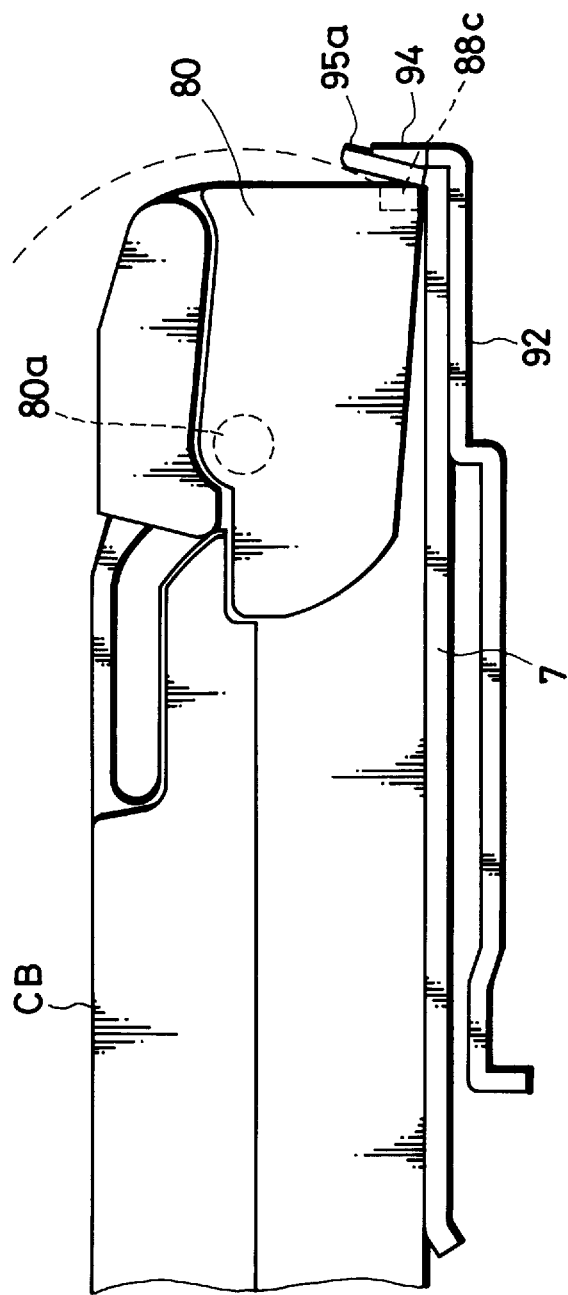
FIG. 13 is a diagram showing the large cassette inserted into the cassette holder equipped with the holder stopper mechanism.
Figure 14:
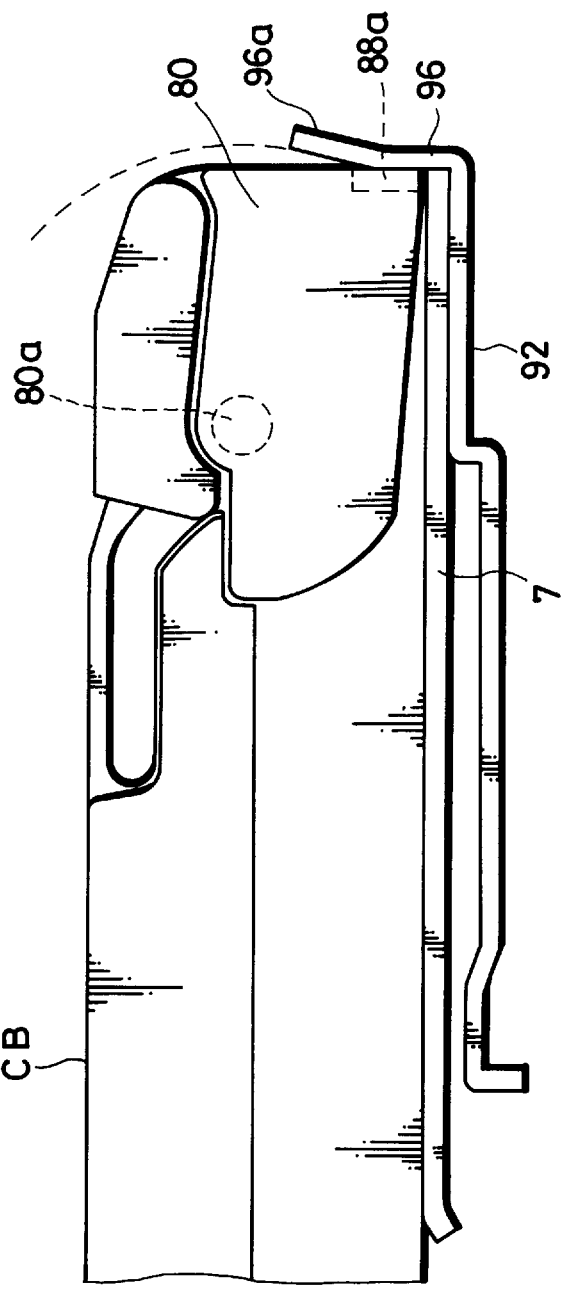
FIG. 14 is a diagram showing the large cassette inserted into the cassette holder equipped with the holder stopper mechanism.

FIG. 13 shows a state in which the large cassette CB abuts at its second abutting portion 88c against the first abutting guide tab 95 of the holder stopper mechanism 91. FIG. 14 shows a state in which the large cassette CB abuts at its first abutting portion 88a against the second abutting guide tab 96 of the holder stopper mechanism 91.

Specifically, the large cassette CB opens its cassette lid 80. In this case, since the oblique surface 95a provided at the upper portion of the first abutting guide tab 95 is inclined outside, the cassette lid 80 opening along the opening locus will not face obstruction. Further, since the oblique surface 96a provided at the upper portion of the second abutting guide tab 96 is inclined outside, the cassette lid 80 opening along the opening locus will not face obstruction.

Figure 15:
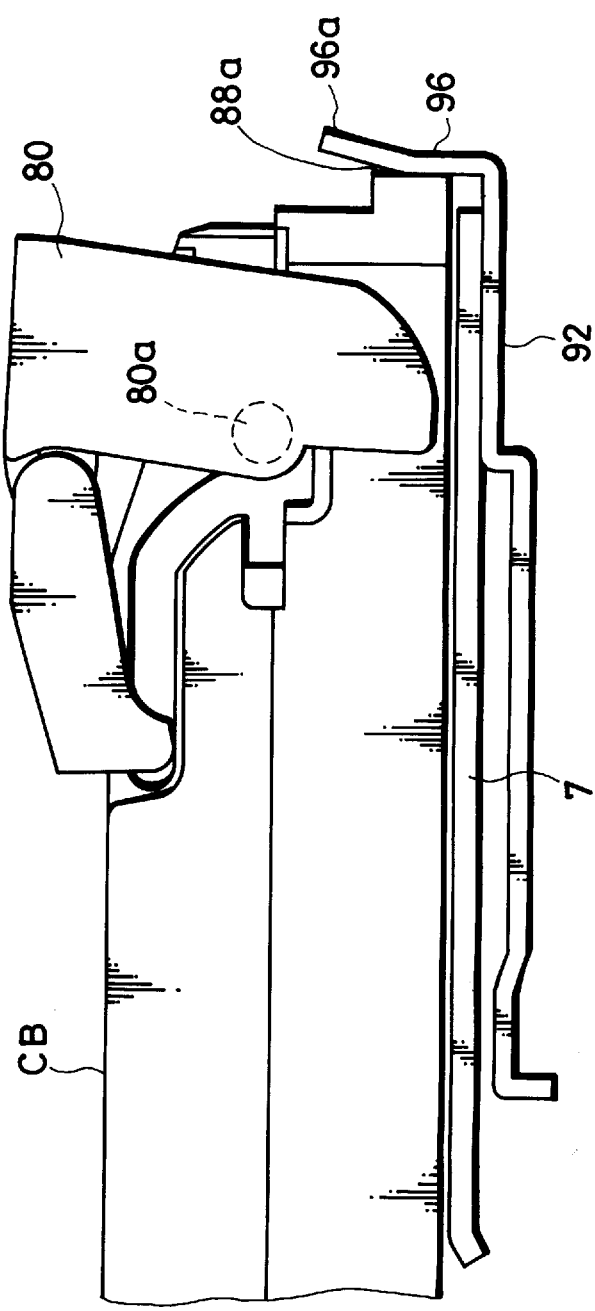
FIG. 15 is a diagram showing the large cassette which is inserted into the cassette holder equipped with the holder stopper mechanism and placed at the loading position.

FIG. 15 shows a state in which the cassette holder 7 is lowered to reach the loading position. At that time, since the large cassette CB is merely floated a little above the support surface of the cassette holder 7, the first abutting portion 88a of the large cassette CB can be prevented from running on the second abutting guide 96.

Particularly, since the second abutting guide tab 96 is provided, if the user performs a malicious operation such as to press the rear end portion of the large cassette CB in the midway of discharging operation to prevent the cassette from smooth discharge, and the large cassette CB is floated at its front end portion to be inclined, the large cassette CB abuts at its front end portion against the second abutting tab 96 having a certain height. Therefore, the large cassette CB can be prevented from running on the holder unlocking tab 94 or the first abutting guide tab 95.

While the above embodiments have been described in conjunction with the VTR apparatus of a compatible system for use with two kinds of tape cassettes different in size, i.e., the small cassette and the large cassette, it is needless to say that the present invention can be applied to other VTR apparatus for use with tape cassettes of more than three kinds different in size. Moreover, the present invention can be widely applicable to the cassette positioning guide mechanism of the recording and reproducing apparatus such as an audio apparatus or the like.

As described above, according to the present invention, in the recording and reproducing apparatus in which two or more kinds of cassettes different in size can be inserted from one cassette insertion mouth, and which can perform shifting motion for shifting the cassette inserted from the insertion mouth to the loading position while the cassette is held by the cassette holder in a standby mode and also perform shifting motion for shifting the cassette to the eject position while the cassette is held by the cassette holder, the pair of positioning guide members for guiding both the side faces of the small cassette are provided on the cassette supporting surface of the cassette holder so as to be depressed and projected by the biasing means, and the cassette holder is made to have both the side plates to serve as guide plates for guiding both the side faces of the large cassette. Therefore, the small and large cassettes different in size and thickness can be accurately inserted and positioned on the cassette holder by the positioning guide mechanisms respectively exclusively useful for the cassettes. Moreover, since it is not necessary for the cassette to be equipped with a special guiding function at all, the appearance of the cassette may not be deteriorated in terms of design. Furthermore, since the cassette need not be subjected to restriction in terms of shape and function, a smaller cassette can be realized upon designing the small cassette. Accordingly, it is possible to obtain a smaller recording and reproducing apparatus.

Since the positioning guide member is provided with the cassette lid unlocking tab serving as an abutting tab for the small cassette, the small cassette can be guided into the cassette holder and positioned in the depth direction, and at the same time, the cassette lid locking nail can be released.

Since the biasing means of the positioning guide member is formed of a spring member, the positioning guide member can be easily arranged to be depressed or projected relative to the cassette holder.

Since the positioning guide member is made to have a slope which increases in height from the cassette insertion side to the opposite side thereof and provided with the cassette lid unlocking tab at the top of the slope, even a cassette with a thin thickness can be maintained to contact at its cassette lid locking tab to the cassette lid unlocking member. Thus, the small cassette is free from restriction in its thickness, and a smaller cassette can be realized. Moreover, when it is considered that the small cassette is designed for use with a recording and reproducing apparatus exclusively useful for a small cassette, the thickness of the small cassette can be decided regardless of a case in which the small cassette is used with a VCR apparatus which copes with not only a small cassette but a large cassette. Therefore, a smaller recording and reproducing apparatus can be designed.

Since the positioning guide member is provided with the guide surface for leading the small cassette inserted into the cassette holder, the cassette can be led and guided by the guide surface, and accurately inserted into the positioning guide member.

Further, according to the present invention, the recording and reproducing apparatus includes the cassette insertion detecting switch mechanism which is disposed at the entrance side of the cassette holder and useful for detecting the insertion of the cassette into the cassette holder and leading the cassette into the cassette holder, and the holder stopper mechanism composed of the holder unlocking member which projects on the cassette stopper portion side of the cassette holder and arranged to retreat when it is contacted to the front end portion of the cassette and a lock member for unlocking the lock of the cassette holder in ganged relation with the retreat operation of the holder unlocking member. Therefore, erroneous insertion of the cassette can be accurately detected in the recording and reproducing apparatus for use with two or more kinds of cassettes different in size, and the erroneously detected cassette can be discharged.

Further, the cassette need not be subjected to restriction in terms of design and size, and in case of the smaller cassette, the cassette can be made smaller. Therefore, the recording and reproducing apparatus for use with only the small cassette can be small-sized.

Further, the cassette insertion detecting switch mechanism and the holder unlocking member of the holder stopper mechanism are separately disposed on the right and left sides of the path in which the cassette is inserted into the cassette holder. Therefore, even if the cassette is erroneously inserted into the cassette holder without actuating neither of the cassette insertion detecting switch mechanism and the holder stopper mechanism, the erroneous insertion of the cassette can be detected and the cassette can be automatically discharged.

The holder stopper mechanism is provided at its portion with the abutting guide member which projects higher than the holder unlocking member in order that the cassette is prevented from running on the holder unlocking member. Therefore, even if the user performs a malicious operation such as to block the cassette from being discharged in the midway of the ejecting operation, leading to the floating state of the cassette from the cassette holder at its front end portion, the cassette can abut against the abutting guide member at its front end portion, thereby being prevented from running on the holder unlocking member. Accordingly, the cassette can be positively discharged.

Moreover, if the cassette holder is normally inserted into the cassette holder, the holder unlocking member can be actuated by the cassette abutting portions of the cassettes having the different sizes. Therefore, the cassette holder may be provided with only one holder unlocking member that serves for both the small cassette and the large cassette, and hence the arrangement can be simplified.

Further, since the abutting guide member is formed to be inclined outside from the deepest edge of the cassette holder, the cassette lid is free from obstruction when it is opened and closed. Therefore, smooth opening and closing operation of the cassette lid will be guaranteed.

Furthermore, if the holder stopper mechanism according to the present invention is applied to the VCR apparatus of a compatible system in which two or more kinds of cassettes different in size can be used, the VCR apparatus becomes more reliable.

Having described preferred embodiments of the present invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A recording and reproducing apparatus in which two or more kinds of cassettes different in size consisting of at least a large cassette and a small cassette each having a pair of side edges and which can be inserted into one cassette insertion mouth, and which can perform shifting motion for shifting said cassette inserted into the insertion mouth to a loading position while said cassette is held by a cassette holder in a standby mode and also can perform shifting motion for shifting the cassette to an eject position while said cassette is held by said cassette holder, comprising:

a pair of positioning guide members provided on a cassette supporting surface of the cassette holder which are movable by biasing means between a first position, wherein said positioning guide members project through an aperture formed through the cassette supporting surface of the cassette holder so as to guide the side edges of the small cassette into the cassette holder, and a second position, wherein said positioning guide members are retracted into said aperture when a large cassette is inserted into said cassette holder; and side plates extending from both sides of said cassette holder which serves as guide plates for guiding the side edges of the large cassette into the cassette holder.

2. A recording and reproducing apparatus according to claim 1, wherein said positioning guide member is provided with a cassette lid unlocking tab serving as an abutting tab for said small cassette.

3. A recording and reproducing apparatus according to claim 1, wherein said biasing means of the positioning guide member is formed of a spring member.

4. A recording and reproducing apparatus according to claim 1, wherein said positioning guide member is made to have a slope which increases in height from the cassette insertion side to the opposite side thereof, and also have a cassette lid unlocking tab formed at the top of said slope.

5. A recording and reproducing apparatus according to claim 1, wherein said positioning guide member is provided with a guide surface for leading said small cassette into the cassette holder.

6. A recording and reproducing apparatus in which two or more kinds of cassettes different in size consisting of at least a large cassette and a small cassette and which can be inserted into one cassette insertion mouth, and which can perform shifting motion for shifting said cassette inserted into an insertion mouth to a loading position while said cassette is held by a cassette holder in a standby mode and also can perform shifting motion for shifting the cassette to an eject position while said cassette is held by said cassette holder, comprising:

a cassette insertion detecting switch mechanism disposed at an entrance side of said cassette holder and useful for detecting the insertion of said cassette into said cassette holder, said cassette insertion detecting switch mechanism further leading said cassette into said cassette holder; and a holder stopper mechanism comprised of a locking tab on one end thereof which can be engaged with a block member attached to a cassette compartment frame and is biased by spring means to be in a locking relationship with said block member wherein in said locking relationship, movement of said cassette holder is prevented, said holder stopper mechanism further comprising a holder unlocking member which projects from a front end side of a cassette supporting surface of said cassette holder, said holder unlocking member further including an abutting guide tab member movable between a stationary position, and a retracted position, wherein the front end portion of either the large or small cassette abuts thereagainst so as to pivotally rotate said holder stopper mechanism and thereby disengage said locking tab from said block member such that the cassette holder can be moved to its loading position, wherein when a cassette is erroneously inserted into said cassette holder, said abutting guide tab member remains in its stationary position so that said locking tab remains engaged to said block member thereby preventing movement of said holder unlocking member, stopping loading movement of said cassette holder and discharging said cassette from said cassette holder.

7. A recording and reproducing apparatus according to claim 6, wherein said cassette insertion detecting switch mechanism and said holder unlocking member of said holder stopper mechanism are separately disposed on the right and left sides of a path in which a cassette is inserted into said cassette holder.

8. A recording and reproducing apparatus according to claim 6, wherein said abutting guide tab member projects higher than said holder unlocking member in order that a cassette is prevented from running on said holder unlocking member.

9. A recording and reproducing apparatus according to claim 8, wherein said abutting guide tab member is formed to be inclined outside from the deepest edge of said cassette holder.

10. A recording and reproducing apparatus according to claim 6, wherein said holder unlocking member can be actuated by cassette abutting portions of cassettes different in size when the cassette is normally inserted into said cassette holder.

11. A recording and reproducing apparatus according to claim 1, characterized by being applied to a video cassette recorder.

* * * * *